US 6,714,635 B1

(12) United States Patent
Adams et al.

(10) Patent No.: US 6,714,635 B1
(45) Date of Patent: Mar. 30, 2004

(54) METHOD FOR RESERVATION-LESS INSTANT GROUP CONFERENCING

(75) Inventors: Jeffrey C. Adams, Lafayette, CO (US); James Brennan, Northglenn, CO (US)

(73) Assignee: Voyant Technologies, Inc., Westminster, CO (US)

( * ) Notice: Subject to any disclaimer, the term of this patent is extended or adjusted under 35 U.S.C. 154(b) by 7 days.

(21) Appl. No.: 10/238,121

(22) Filed: Sep. 10, 2002

(51) Int. Cl.[7] ............................................ H04M 3/42
(52) U.S. Cl. ............................ 379/204.01; 379/205.01
(58) Field of Search ......................... 379/202.01, 204.01, 379/205.01, 206.01; 370/261, 356

(56) References Cited

U.S. PATENT DOCUMENTS

| | | |
|---|---|---|
| 5,995,608 A | 11/1999 | Detampel, Jr. et al. |
| 6,181,786 B1 | 1/2001 | Detampel, Jr. et al. |
| 6,330,321 B2 | 12/2001 | Detampel, Jr. et al. |
| 6,411,605 B1 * | 6/2002 | Vance et al. ................ 370/261 |
| 6,577,721 B1 * | 6/2003 | Vainio et al. ........... 379/202.01 |
| 2002/0091769 A1 | 7/2002 | Drozdzewicz et al. |

OTHER PUBLICATIONS

U.S. patent application Ser. No. 10/208,893, Ernstrom et al., Related Pending Application.
U.S. patent application Ser. No. 10/208,503, Ernstrom et al., Related Pending Application.
Voyant Mobilemeeting Brochure, 2002.

* cited by examiner

*Primary Examiner*—Creighton Smith
(74) *Attorney, Agent, or Firm*—Dorr, Carson, Sloan, Birney & Kramer, PC (57) ABSTRACT

A conferencing method for providing reservation-less instant group conferencing. A subscriber dials in a conference code and a group code in his/her phone. The input signal is received in the switch serving the phone on sensing the conference code activates a trigger which results in communications with a conferencing system. The conference call is set up in a conferencing bridge and the phone of the subscriber is routed to the conferencing bridge. The conferencing system using group code obtains a group of phone numbers of participants from a database and calls each participant and connects each call participant to the conference call. Subscriber setting lists of participants and phone numbers in advance of the conference call with Internet access to the database.

21 Claims, 8 Drawing Sheets

METHOD FOR RESERVATION-LESS INSTANT GROUP CONFERENCING

BACKGROUND OF THE INVENTION

1. Field of the Invention

The present invention pertains to call conferencing and, in particular, to reservation-less instant conferencing, as it relates to business and consumer wireless and wireline telecommunication service subscribers.

2. Statement of the Problem

A need exists for telephony carriers to provide simplified conferencing services to business and consumer telephone service subscribers. Practicality of the conferencing service for users is becoming more dependent upon extreme ease of use through simple, easy to remember access methods that utilize conferencing automation to the maximum practical extent.

U.S. Pat. Nos. 5,995,608; 6,181,786; and 6,330,321 owned by the assignee of the present invention, set forth a method and apparatus for on-demand teleconferencing. This represents a prior call conferencing approach eliminating prior scheduling and operator interaction in setting up a conference call. This prior art approach uses, for example, the Signaling System No. 7 (SS7) out-of-band signaling to dynamically route incoming conference calls to bridges in a conferencing system having available resources. In operation, a subscriber to the conferencing service is given a telephone number for connecting to the conferencing system along with a system pass code and a maximum conference size at the time he or she signs up for the service. In order to have a conference, the subscriber distributes his or her access telephone number to the conference participants along with an access code and optional conference security (or PIN) code of the subscriber's choosing. The processing of the conference call, billing, etc. is handled at the conferencing system.

This mechanism is considered overly complex for application to users in new markets such as mobile and consumer because of the need to remember these access telephone numbers, access codes, and PIN codes, and the need to distribute this information to other participants and plan the call in advance.

U.S. Pat. No. 2002/0091769, owned by the assignee of the present invention and entitled "Conferencing Method" allows a subscriber to use the Internet to set up a conference call. The pending following applications, also owned by the assignee of the present invention, represent a simplified conferencing system and method for a subscriber wherein participants call into the subscriber's phone number: "Local Exchange Subscriber Line Conferencing", Ser. No. 10/208,893 filed Jul. 30, 2002 and "Local Exchange Subscriber Line Conferencing Method" filed Jul. 30, 2002 as Ser. No. 10/208,503.

Current conferencing service available to users includes three-way calling that is typically accessed by placing one party on hold by pressing a key on the mobile handset or using the flash hook on a landline phone, creating a call to a third party, then connecting the two calls together by pressing another key on the handset or by pressing the flash hook once again. A need exists to extend the capabilities of this type of service through significant simplification of access mechanism as well as through availability of greater than three call legs simultaneously involved in a conference call event.

Current conferencing service available to mobile users also includes the Direct Connect™ service offered by Nextel Communications. This service is accessed only while the user is in their home mobile network coverage area by selecting a pre-defined group of other Nextel Direct Connect users from the mobile handset address book and pressing the "Push to Talk" or PTT button on a specialized handset. This feature creates a two way radio service with the members of the group who can instantly talk to other members of the group simply by pressing the PTT button on their handsets and speaking. This is a half duplex feature where only one person can speak at a time. A need exists to extend the capabilities of this type of service through availability of full duplex sound capability, through the ability to access the service while roaming outside of the user's home mobile network coverage area, through the ability to connect with users outside of the given wireless carrier's network, and through the extension of this feature outside of the mobile network and on any standard wireless or wireline telephone.

SUMMARY OF INVENTION

The present invention solves the aforestated problem and meets the needs stated therein. The instant group calling of the present invention, from the perspective of the conferencing system, is characterized by reservation-less instant conferencing, as it relates to business and consumer wireless and wireline telecommunication subscribers. From the perspective of the user, the service of the present invention is characterized by a simplified access method for conferencing services that takes advantage of telecommunication network capabilities to eliminate many of the current art complexities involved with accessing such service and by enhanced capabilities which overcome current art limitations allowing conferencing in a full duplex environment with endpoints outside of a given carrier's network, whether wireless or wireline.

DETAILED SPECIFICATION

1. Overview

The conferencing service of the present invention enables Telephony Carriers to provide simple conferencing to business and consumer telephone service subscribers. The present invention, in one embodiment, uses the conventional telephone "#" (pound) key to initiate a conference call and like other telephone pound services, conferencing is activated by selecting the "#" key followed by a unique set of key entries. Other access methods that do not use a "#" key code sequence for access represent additional embodiments of this present invention. These are conventionally referred to as dual-tone multifrequency (DTMF) signals. Any series of unique input signals from a phone of a subscriber can be used when the subscriber accesses the conference call.

The user enters the pound key or other access method (hereinafter referred to as a "first string" or "conference code") followed by a series of digits which represent a group of people to whom the user wishes to call (hereinafter referred to as a "second string" or "group code"). Members of this group are then joined to the conference via a dial-out from the conference.

Groups are created and defined in advance via any number of possible user interfaces including but not limited to a website, a WAP interface, or speech recognition system. Group information is stored in a network based database which is accessed by the conferencing system.

As a result, no advance reservation for using the conferencing system is required and the subscriber can instantly commence the conference call at any time by dialing the conference code and the group code in his/her phone. The present invention is a method for reservation-less instant group conferencing.

2. Operation a. System

Figure 1:
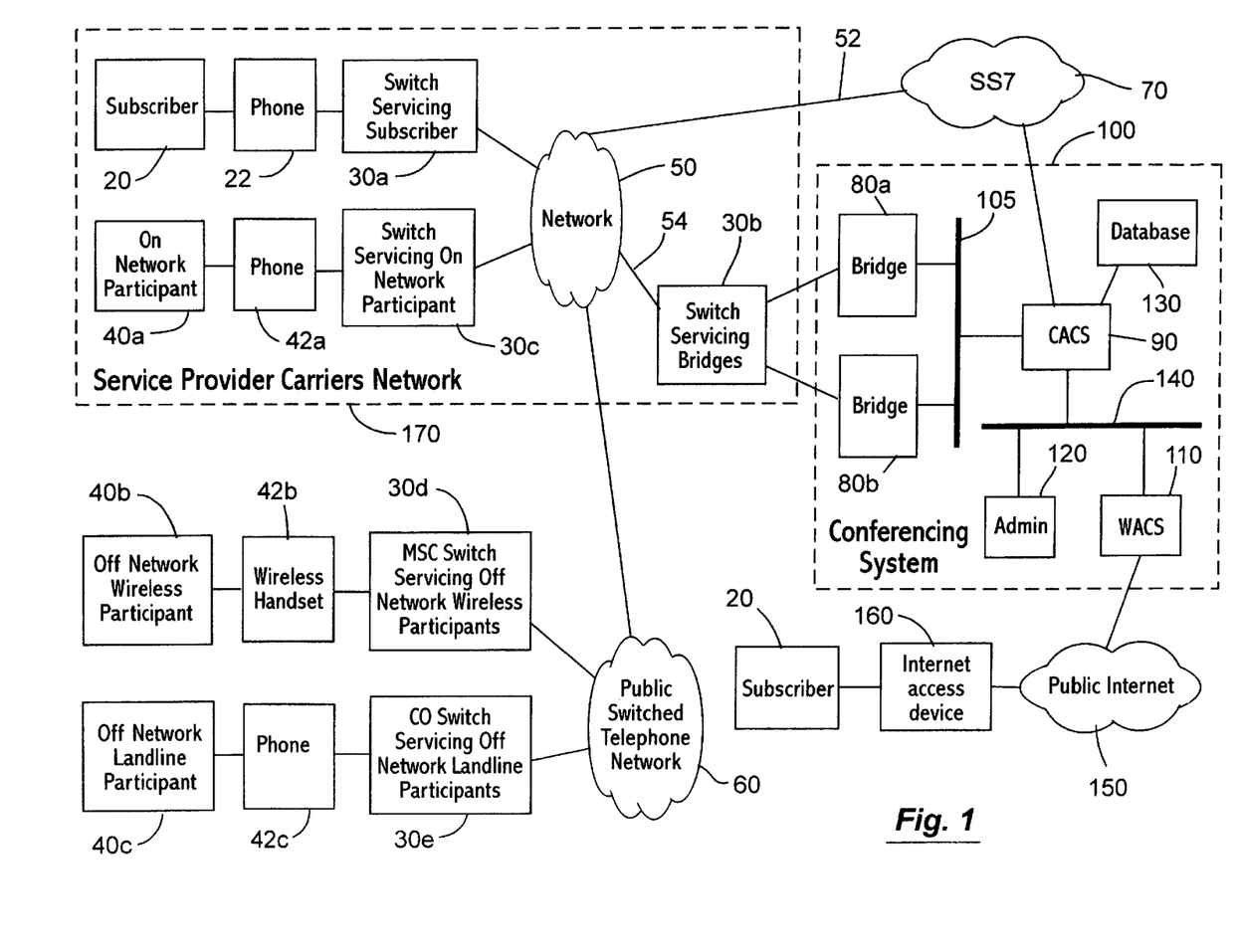
FIG. 1 sets forth one embodiment of the telecommunication network incorporating the conferencing service 10 of the present invention.

In FIG. 1, the overview of the telecommunication network incorporating the reservation-less instant group conferencing service of the present invention is set forth.

A subscriber 20 setting up the conference call is shown in communication with a telephony switch 30a via a phone 22. Likewise, additional participants 40a–40c to the conference call are shown connected to other switches 30c–30e by phones 42a–42c. In FIG. 1, the additional participants 40a–c are illustrated having access to different switches 30c–e. Switch 30c is in the same network 170 as the subscriber's switch 30a. Switch 30d is within a different wireless carrier's network. Switch 30e is within a different landline carrier's network. It is to be expressly understood that each additional participant 40 could be accessing a different switch 30 in different parts of the world with different wireless or wireline carriers. It is also to be expressly understood that each additional participant 40 could be accessing the same switch 30 as each other and even the same switch as the subscriber 20. It is also to be expressly understood that the subscriber 20 can be accessing the switch 30a through a wireless or wireline phone set 22, and that the present invention is not limited to any particular type of phone set 22. It is also to be expressly understood that the additional participants 40 can be accessing the switch 30 through a wireless or wireline phone set 42, and that the present invention is not limited to any particular type of phone set or other type of telecommunication access device.

The switches 30a–c within the service providing carrier's network 170 are connected to one another by a network 50 of telephony equipment that could include various switches, routers, and other equipment. The network 50 is conventionally connected to other carrier networks and switches 30d–e via the conventional Public Switched Telephone Network 60.

The network 50 shown in FIG. 1 has two separate communication paths. The first 52 is through the SS7 network 70 which communicates with the Conference Allocation and Control System (CACS) 90 in the conferencing system 100. An example of a commercially available CACS 90 is MOBILEMEETING from Voyant Technologies, Inc. The network 50 also communicates 54 through switch 30b with the conferencing bridges 80a–b. An example of a commercially available conferencing bridge 80 is the INNOVOX media server also from Voyant Technologies, Inc. In FIG. 1, the conference bridges 80 are connected to the network 50 via a switch 30b. It is to be expressly understood that while FIG. 1 shows the conferencing bridges 80 connected to switch 30b, the conference bridges 80 could be connected to any switch in the carrier's network 170, including the switch 30a servicing the subscriber 20 or the switch 30c servicing an on-network participant 40a.

The conferencing bridges 80 are connected to a data network 105 which is also connected to the CACS 90. The CACS 90 in turn is administered over a local area network 140 by an operator/administrator 120.

CACS 90 acts as the conferencing resource manager and contains information about subscribers and/or subscriber profiles and available bridge conferencing resources. The CACS 90 contains a database 130 that stores all of the information about subscribers, including information about the subscriber's contacts such as names and phone numbers. The CACS 90 also communicates with the Wireless Application Control Server (WACS) 110. An example of a commercially available WACS 110 is contained in MOBILEMEETING from Voyant Technologies, Inc. The WACS contains and manages all of the user interfaces for the MobileMeeting product. In one embodiment, this is done via the local area network 140. In another, the CACS 90 and WACS 110 are located on the same physical machine. The WACS 110 as it relates to this invention contains the address book user interface application that is used to populate the database 130 with contact information such as names and phone numbers.

The subscriber 20 accesses the address book application using an Internet access device 160 such as but not limited to a personal computer, a mobile handheld computer or personal digital assistant (PDA) with internet access, a wireless phone with internet access, or other telecommunication access device. The Internet access device 160 connects to the WACS 110 via the public Internet 150. It is to be expressly understood that this is only one embodiment of a method to populate the database 130 with contact information. It is to be expressly understood that any other methods used to populate the database 130 would be additional embodiments of this invention such as, but not limited to, called-in information, input information, etc.

As shown in FIGS. 1–5, 'dynamic' routing, using SS7 70, of a conference to a bridge 80 occurs and represents one embodiment. It is to be expressly understood that many alternate embodiments under the teachings of this present invention could be implemented. Examples of such embodiments include use of non-SS7 data communication mechanisms between the CACS 90 and switch 30 as well as use of signaling in the voice channel between the conferencing system 10 and the switch 30.

b. Subscriber

The method of the present invention centers on the functions of the subscriber 20 which are detailed below. The term "user" is used herein to mean "subscriber."

The subscriber 20 has the retail relationship with the telephony carrier 170. The subscriber receives telephony service from the carrier 170 and has selected to receive the conferencing service of the present invention as an additional service such as call waiting, caller ID, or mobile internet from the carrier. In one embodiment, the subscriber "subscribes" by paying a fee to obtain the conferencing method of the present invention. In another embodiment, no fee is paid. The term "subscriber" is used, but is used in its broadest sense whether or not a separate fee is paid.

The subscriber 20 interfaces, in one embodiment, with the invention through a mobile handset 22. The conference is initiated by the subscriber 20 entering a first string of input signals for the conference code followed by a second string of input signals for the group code. For example, '##' (i.e., pushing the "pound" key twice) for the conference code, followed by a unique digit or set of digits, for example "05" for the group code. Any unique series of input signals from the mobile handset 22 such as a series of key inputs can be used. The first string of input signals (i.e. the '##' keystrokes in this example) identifies that the user is attempting to initiate a conference. The second string of input signals is used to identify a group of phone numbers which will be called to join the conference. The subscriber then presses the 'send' key on the mobile handset. A landline phone 22 normally does not have a "send" key. At that time, the subscriber 20 will be put into the conference and the phone numbers associated with the selected group are dialed out from the conference.

Dialed parties' phones will ring and if the endpoint has the capability to display the calling party's number (e.g. via a caller ID function), the calling party's number is displayed. When the phone is answered, the dialed party is greeted with an Interactive Voice Response (IVR) message stating, for example: "You are being called to join a teleconference, please press 1 to join." Optionally, the subscriber can choose to have the system record a message from the subscriber prior to dialing the dialed parties. This recorded message is then played to each dialed party in place of the previous IVR statement. Dialed parties who do not press 1 to join the call are disconnected by the conference. Dialed parties who press 1 are joined to the conference.

It is to be expressly understood that in the aforesaid, while a wireless phone is used as an example of an endpoint for the subscriber, any other suitable device such as a landline phone or voice enabled mobile computing device could be utilized under the teachings of the present invention.

It is also to be expressly understood that the first string (conference code) in the aforesaid starts with the "pound" key as the preferred key of use due to its conventionality in the telephone industry and understanding by the public, any other suitable function key signal, voice command, code input, or other stimulation mechanism could be utilized under the teachings of the present invention. As another embodiment, a special key on a wireless telephone or icon on a wireless phone or wireless computing device is activated to generate the first string signal series.

Routing of the calls to the conferencing bridge 80 is controlled by the switch and the CACS. When the subscriber enters the "##" key sequence (conference code) followed by the unique set of digits (group code) to initiate the conference in one embodiment of the invention, the switch directs the subscriber via a Dialed Number Trigger (DNT) to the bridge.

The switch 30a, utilizing SS7 70 or other signaling method, provides the Dialed Party Number (##05 for example) and the Calling Party Number or Automatic Number Identification (ANI) to the CACS 90. The Dialed Party Number includes the conference code and the group code.

The CACS 90 uses the ANI to identify and validate the subscriber against a database 130 of valid subscribers. The CACS 90 then uses the Dialed Party Number to look up a group of phone numbers to be dialed by the bridge.

The subscriber 20 creates groups and assigns digits to the groups in advance of the conference via any number of possible user interfaces including but not limited to a website, a WAP interface, or speech recognition system. Group information is stored in a network based database which is accessed by the conferencing system.

C. Initiating the Instant Group Call Conference

Figure 2:
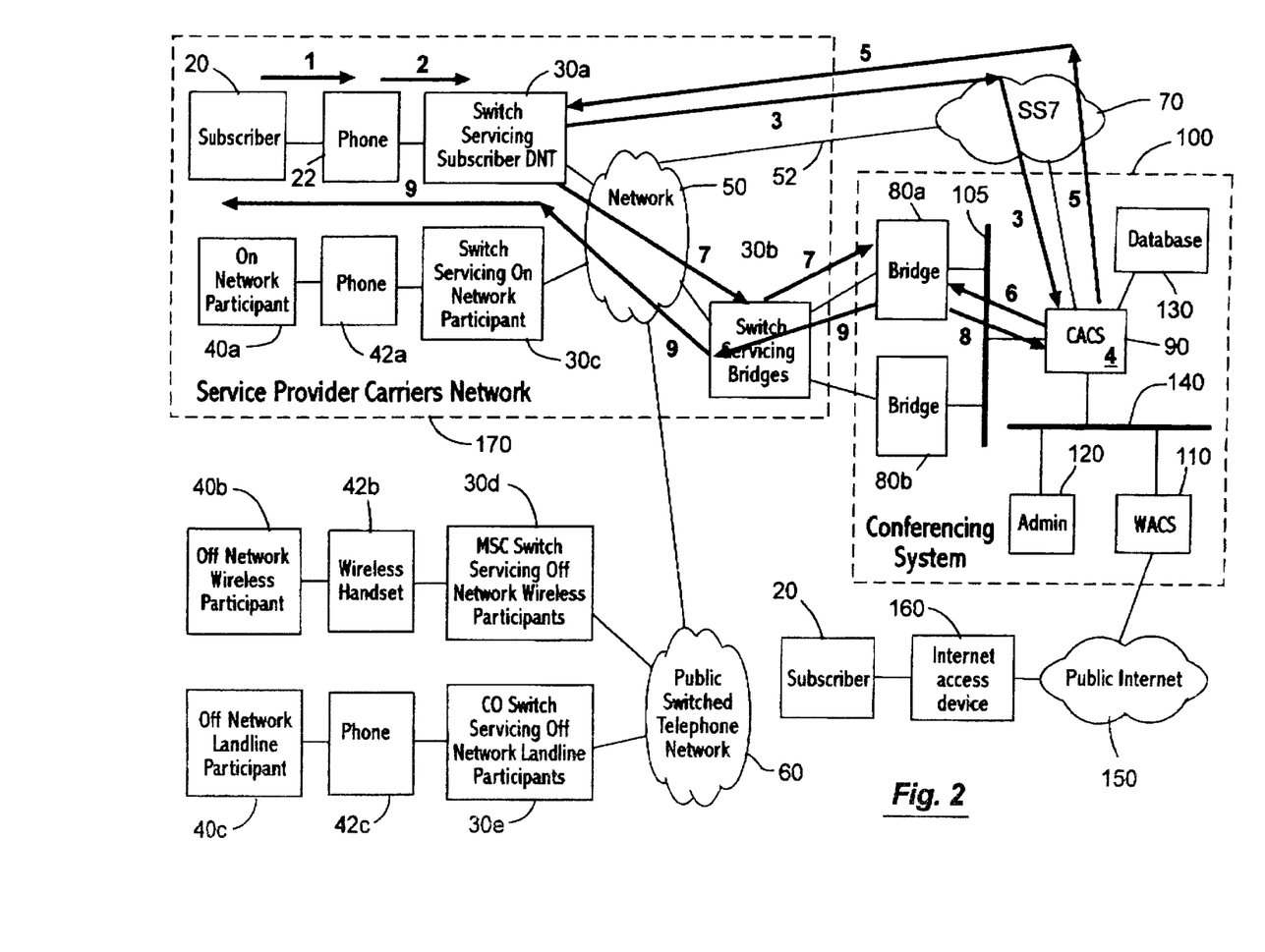
FIG. 2 sets forth the operation of the conferencing service 10 of the present invention in setting up an instant group call.

In FIG. 2, operation of the conferencing system of the present invention in setting up an instant group conference call is set forth.

The following "numbers" identify the sequence flow of one embodiment which is illustrated by the arrows in FIG. 2. This is the method of the present invention by which a subscriber 20 initiates a conference call.

1. The subscriber 20 picks up the handset of the phone 22.

2. The subscriber 20 inputs signals in phone 22 such as dialing (for example) ##05. The input signals comprise a first string (conference code) of "##" and a second string (group code) of "05." The first string informs the CO switch 30a that the subscriber is requesting an instant group conference call and the CO switch 30a activates a dialed number trigger (DNT).

3. The local CO switch 30a responds to the dialed number trigger (DNT) by sending a signaling message which communicates to the CACS 90 that a subscriber 20 of the conferencing service is initiating an instant group conference call. The subscriber's phone number is included in the "Calling Number" parameter of the message. The number that the subscriber dialed ("##05" in this example) is contained in the "Called Number" parameter of the message. In FIG. 2, one embodiment delivers its message via the SS7 70 to CACS 90. In the SS7 environment, one embodiment is a conventional ISUP message. Another embodiment is a conventional TCAP message.

4. In one embodiment, the CACS 90 uses the Calling Number contained in the ISUP message to validate the subscriber 20 and determine the profile of the conference (which may include enabled conferencing features and maximum conference size). In another embodiment, the switch 30a may perform all subscription validation and the Calling Number may be used by the CACS 90 to determine conference profile. In all embodiments, based on the conference profile, the CACS 90 will determine which bridge 80 (if there are multiple bridges) shall host the conference based on resource availability.

5. Assuming that the caller is a valid subscriber, the CACS 90 sends a signaling message through the SS7 network 70 to the switch 30a including the network address of the bridge 80 (in this example, bridge 80a) that will host the conference.

6. The CACS 90 notifies the bridge 80a over the data network 105 that will be hosting the conference that a conference is about to commence, and instructs the bridge 80a to allocate the ports required to host the conference based on the conference profile.

7. Upon receipt of the signaling message sent in step 5, the switch 30a routes the call of the subscriber 20 to the conferencing bridge 80a.

8. The bridge 80*a* notifies the CACS 90 that the conference is underway.
9. The bridge 80*a* notifies the subscriber 20 that the call has been set up by playing a unique confirmation sound file or other suitable message.

The above method steps and message contents represent only an embodiment of the present invention and, it is to be understood, that method steps order and message contents can vary based upon individual telecommunication architects, protocols and signaling requirements without departing from the spirit of the present invention.

d. Dialing out to Participants of the Instant Group Call

Figure 3:
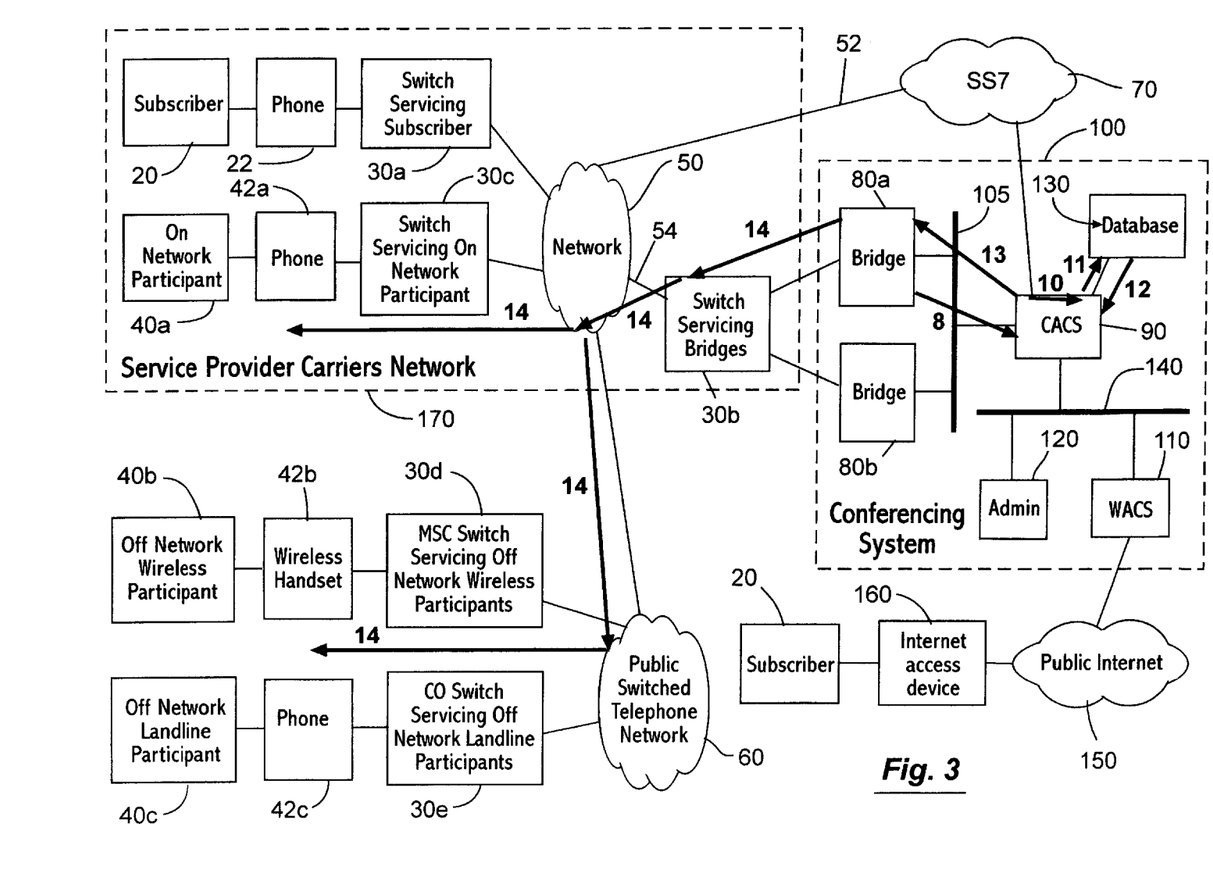
FIG. 3 sets forth the operation of the conferencing service 10 of the present invention in dialing out to participants of the instant group conference call.

In FIG. 3, operation of the conferencing system 10 of the present invention in dialing out to participants of the instant group conference call is set forth.

The following "numbers" identify the sequence flow of one embodiment which is illustrated by the arrows in FIG. 3. This is the method of the present invention by which participants are dialed for the instant group conference call. These steps take place immediately following step 9 in the sequence flow described above in section c. and illustrated in FIG. 2.

10. The CACS 90 uses the Called Party Number (number dialed by the subscriber, in this example, ##05) passed from the switch 30*a* in step 3 above to determine that the subscriber 20 is initiating an Instant Group Call.
11. The CACS 90 uses a combination of the Called Party Number and the Calling Party Number to determine what phone numbers to dial to add participants based on the second string of input signals (i.e., "05" in the example). It does this by querying a database 130 containing group information such as group names, group numbers, and phone numbers of group members for each subscriber. The Called and Calling numbers will form a key that resolves to a group of phone numbers. The Called number represents the group to be dialed, whereas the Calling number represents the subscriber. These two numbers together will uniquely resolve to a Call Group, which contains one or more participant phone numbers.

Figure 6:
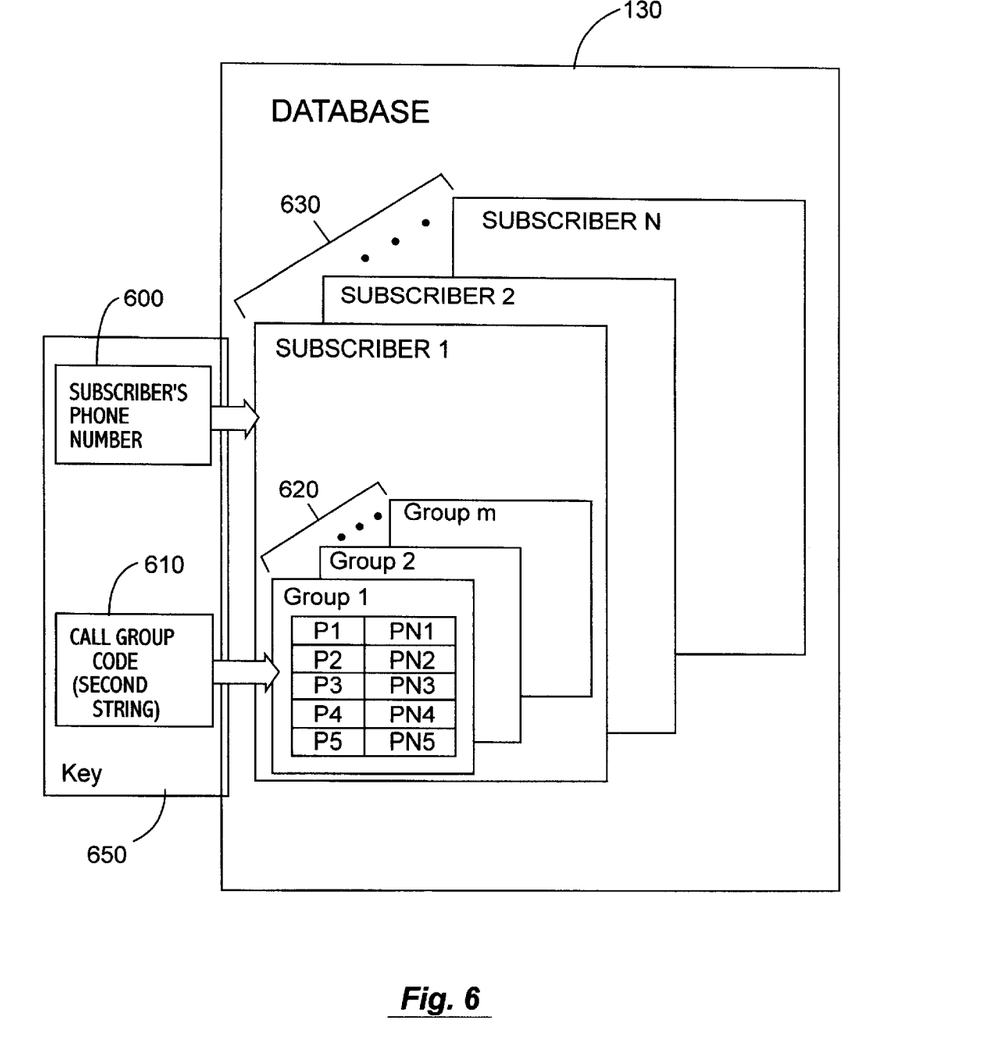
FIG. 6 sets forth one embodiment of the database of the present invention.

In FIG. 6, the database 130 is shown to service a number of subscribers. Each subscriber has their own storage or memory area in the database 130 or an area relationally or associatively dedicated to the subscriber. In FIG. 6, N subscribers are served. In one embodiment, it is the subscriber's phone number (Calling Party Number) that is used to access a given subscriber's stored information. The Called Party Number is used to access which group. Hence, FIG. 6, in one embodiment, shows the Call Group Code 610 which forms the second string of input signals dialed in by the subscriber accesses the desired group as each group has its own unique Call Group Code (or its own unique second string of input signals). As already discussed, the first string of input signals received by the switch 30*a* indicates that this is an instant group conference call whereas it is the second string that provides the unique Call Group Code 610. Hence, the Called and Calling Party Numbers form a key 650 that is used to retrieve from database 130 a given call group from a plurality of call groups 620 for a given subscriber from a plurality of subscribers 630. For example, and in FIG. 6, if Group 1 is selected, then the group has five participants (P1 through P5) and five corresponding phone numbers (PN1 through PN5). These then are the five participants for the conference call that the subscriber has requested with the unique call group code 610 (i.e., the second string of input signals). This is a list of participant phone numbers being requested.

12. The database 130 passes a list of participant phone numbers to be dialed to the CACS 90.
13. Via an Application Programming Interface (API), the CACS 90 instructs the bridge 80*a* over the data network 105 to commence dialing to the phone numbers in the Call Group. This API is a conventional "DialCall" API within the aforesaid MobileMeeting product. The API will be enhanced to include a "who from" field that will contain the original calling party number (subscriber's phone number).
14. The bridge 80*a* then commences dialing to each of the participant phone numbers, connecting through the local servicing switch 30*b*, the Carrier's network 50 and possibly through the PSTN 60 to call all of the listed participants 40. As each phone number is dialed, the original Calling Party Number will be placed in the Calling Party Number field of the signaling message so that the subscriber's phone number will be presented to the participant's phone 42.

The above method steps and message contents represent only an embodiment of the present invention and, it is to be understood, that method steps order and message contents can vary based upon individual telecommunication architects, protocols and signaling requirements without departing from the spirit of the present invention.

e. Participants Join the Instant Group Call

Figure 4:
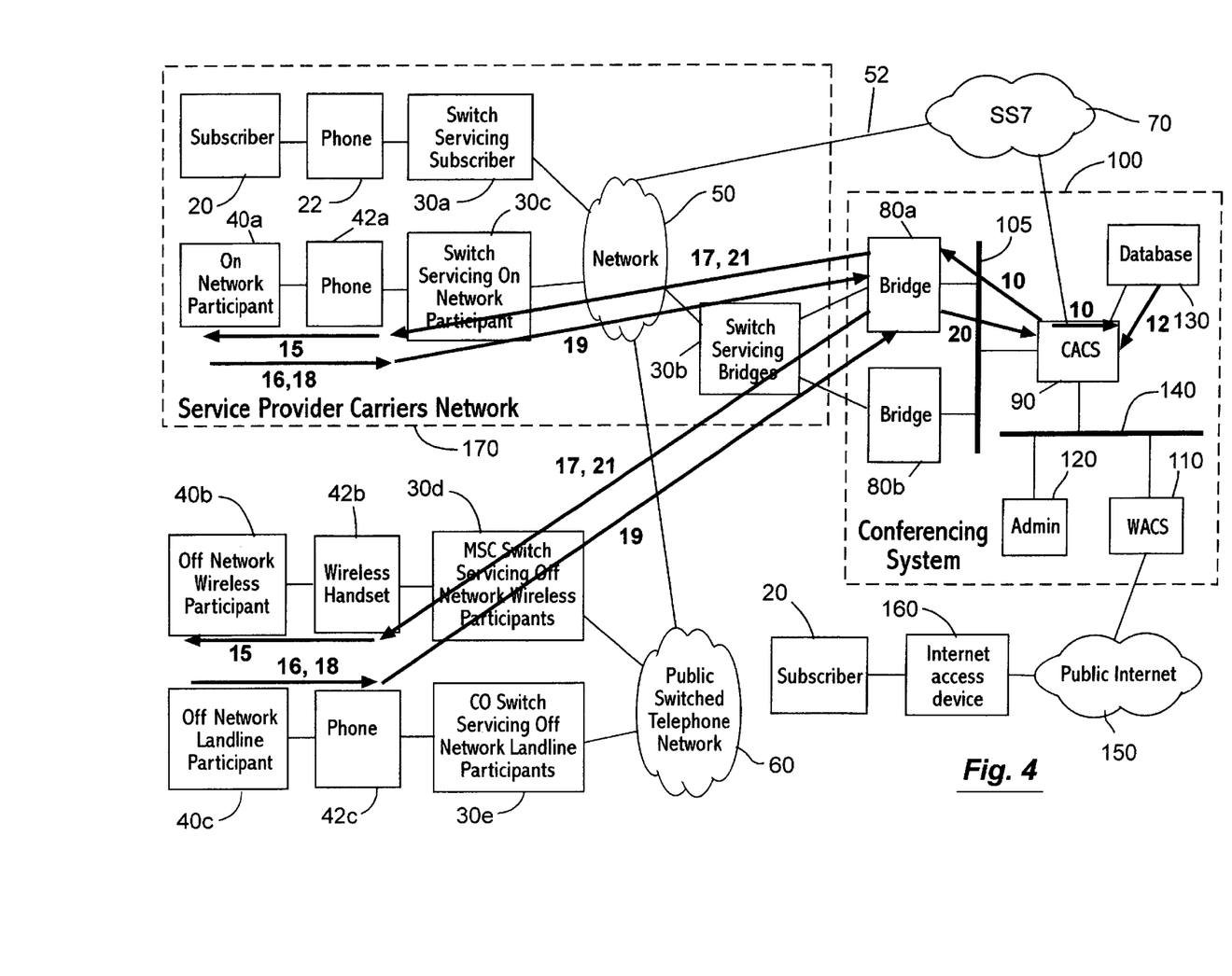
FIG. 4 sets forth the operation of the conferencing service 10 of the present invention in participants joining the instant group conference call.

In FIG. 4, operation of the conferencing system 10 of the present invention in participants joining the instant group conference call is set forth.

The following "numbers" identify the sequence flow of one embodiment which is illustrated by the arrows in FIG. 4. This is the method of the present invention by which participants join and are added to the instant group conference call. These steps take place immediately following step 14 in the sequence flow described above in section d. and illustrated in FIG. 3.

15. Each participant's 40 phone 42 rings and if it has the capability, it displays the original Calling Party Number (the phone number of the subscriber 20).
16. The participant 40 answers the phone 42.
17. When the phone is answered, the participant 40 is greeted with an Interactive Voice Response (IVR) message played by the bridge 80*a* stating, for example: "You are being called to join an instant group call, please press 1 to join." Optionally, if the subscriber 20 chose to record a greeting, this recorded message is then played to each participant in place of the previous IVR statement.
18. Participants 40 who wish to join the call press 1 on their phone 42.
19. This instructs the bridge to place the participant 40 into the conference call.
20. The bridge 80 notifies the CACS 90 that the participant 40 has joined the call.
21. The bridge 80 notifies the participant 40 that they have joined the call by playing a unique confirmation sound file.

The above method steps and message contents represent only an embodiment of the present invention and, it is to be understood, that method steps order and message contents can vary based upon individual telecommunication architects, protocols and signaling requirements without departing from the spirit of the present invention.

f. Subscribers add Call Group Information to the Database

Figure 5:
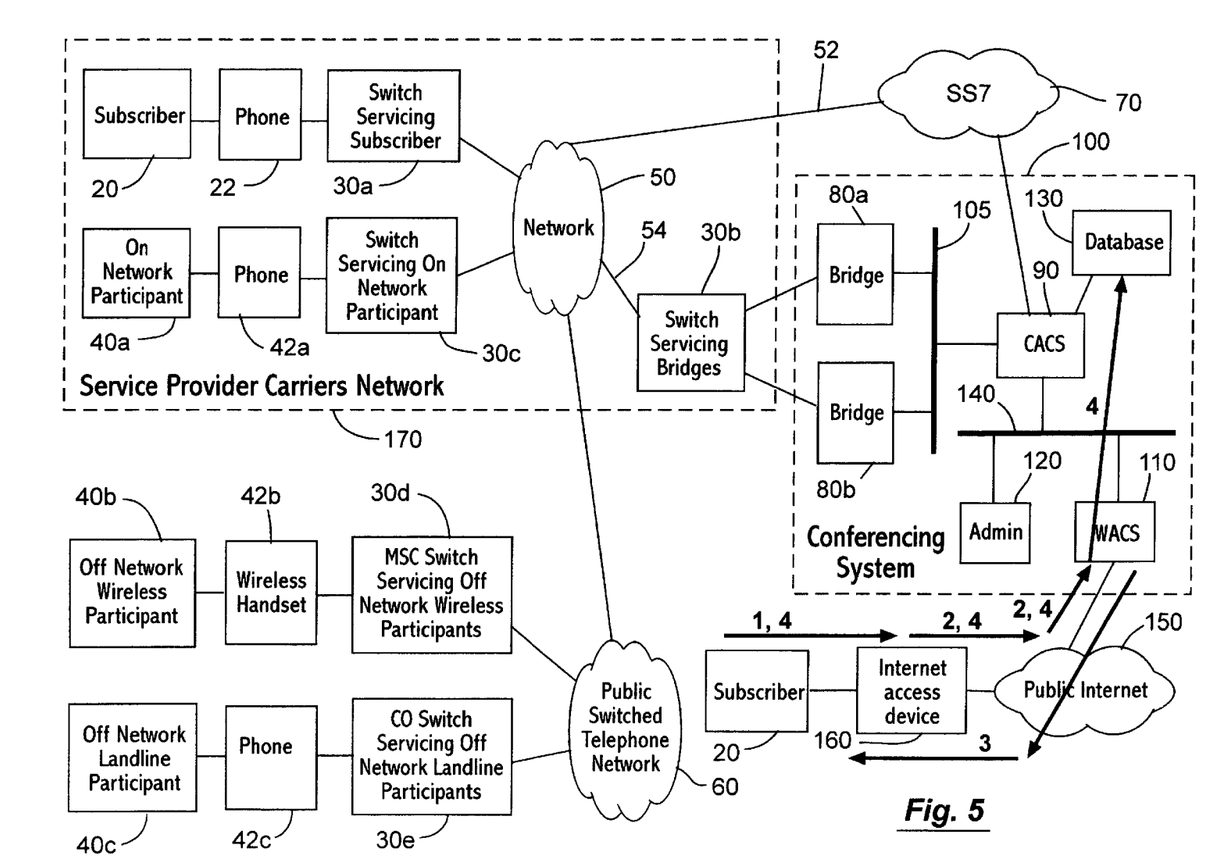
FIG. 5 sets forth the operation of the conferencing service of the present invention in adding contact information to the database.

In FIG. 5, operation of the conferencing system 10 of the present invention in adding call group information to the database 130 is set forth.

The following "numbers" identify the sequence flow of one embodiment which is illustrated by the arrows in FIG. 5. This is the method of the present invention by which subscribers add call group information to the database. These steps take place prior to initiation of the first call to any new call group.

1. The subscriber 20 picks up and/or turns on the Internet access device 160.
2. The subscriber 20 logs into the website for the address book application via the public Internet 150.
3. The WACS 110 presents the graphical user interface (GUI) on the Internet access device 160
4. The subscriber 20 enters the information for the call group (group name, group number, phone numbers of members) into the GUI and chooses to save the information to the database 130.
5. The subscriber is able to build any number of groups 620, as shown in FIG. 6, allocated to his/her profile. This may be a subscription fee requirement. The LEC can choose how many groups to allow for each subscriber. The invention is vigorous in allowing a service provider carrier's network 170 to design an instant group conferencing service under the teachings contained herein for its subscribers. In FIG. 6, the subscriber selects the Call Group Code and in another embodiment, the Call Group Codes are pre-selected. For example, a subscriber may set up the following call groups and input them into the database 130. For example, a subscriber selects the Call Group Code "01" for the following group of participants: John (phone number), Patty (phone number), and Jim (phone number). The subscriber also inputs the Call Group Code "21" for: Carol, Patty, Sandy, Jill, and Betty with their respective phone numbers. Hence, the subscriber in our example can dial "##21" and set up an instant group conference for the subscriber, Carol, Patty, Sandy, Jill, and Betty. Under the teachings of the present invention, the subscriber can access the Internet 150 through a suitable access device 160 and update the database in the conferencing system 100 at any time. Within the constraints of the subscriber's profile, the subscriber can add as many groups, as many participants to each group at any time and could also delete such groups. The subscriber has full interactive access with the database 130.

It is to be expressly understood that in the aforesaid, while an internet access device and the public internet are used as an example of an access method to the GUI and the database, any other suitable device and network such as but not limited to a phone, a mobile handset, a voice enabled mobile computing device, the mobile internet, a virtual private network (VPN), the PSTN, or a mobile carrier's wireless data network could be used as an alternate access method.

3. Summary

Figure 7:
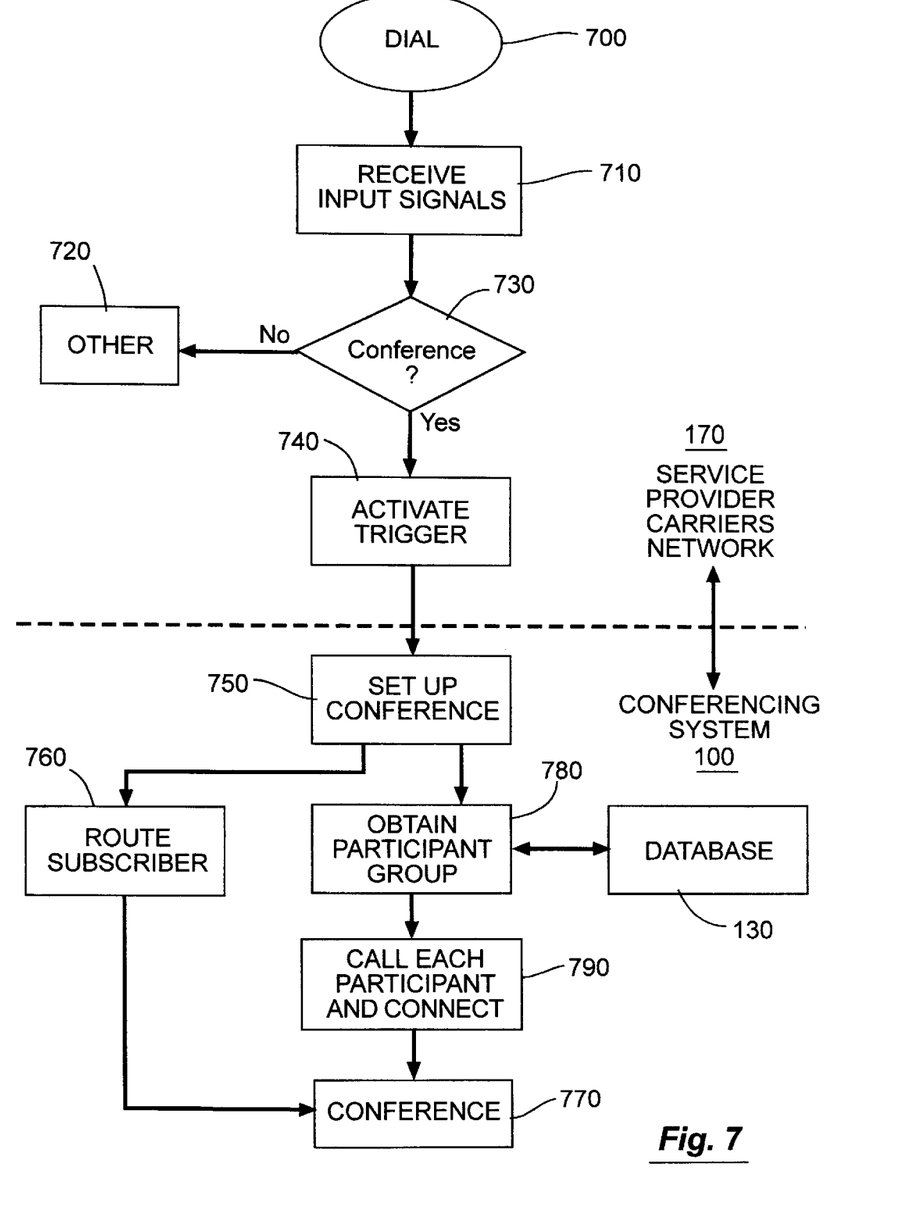
FIG. 7 sets forth one embodiment of the conferencing method of the present invention.

The method of the present invention can be summarized in one embodiment with respect to FIG. 7. The subscriber 20 dials 700 in his/her phone set 22. The Called Party Number dialed consists of the first string and second string of input signals. These input signals are received 710 by the switch 30a in the service provider carrier's network 170. If the received input signal 710 does not have the first string indicating an instant group conference call, stage 720 is entered as this is another type of service. If the first string is detected in stage 730, then a trigger in the switch 30a is activated in stage 740 which in the embodiment is the Dialed Number Trigger.

Through communication such as through SS7 network 70, this event is conveyed to a conferencing system 100 which proceeds to set up a conference call for the subscriber 20 based upon the Called Party Number and the Calling Party Number (i.e., the subscriber's phone number) as a key 650. This occurs in stage 750 in FIG. 7. The conferencing system 100 selects an available bridge 80 in stage 750 based upon the profile of the subscriber. The selection of the bridge and the profile setting and determination are conventional. The subscriber phone 22 is routed 760 to the selected bridge for the conference which occurs in stage 770. The conferencing system 100 obtains 780 a group of phone numbers for the participants from the database 130 based upon at least the second string of the Called Party Number. In stage 790, the conferencing system 100 calls each participant and connects 790 the participant to the conference 770. FIG. 7 presents the method of the present invention generally as it operates in the service provider carrier's network 170 and conferencing system 100 in the telecommunications system shown in FIG. 1.

Figure 8:
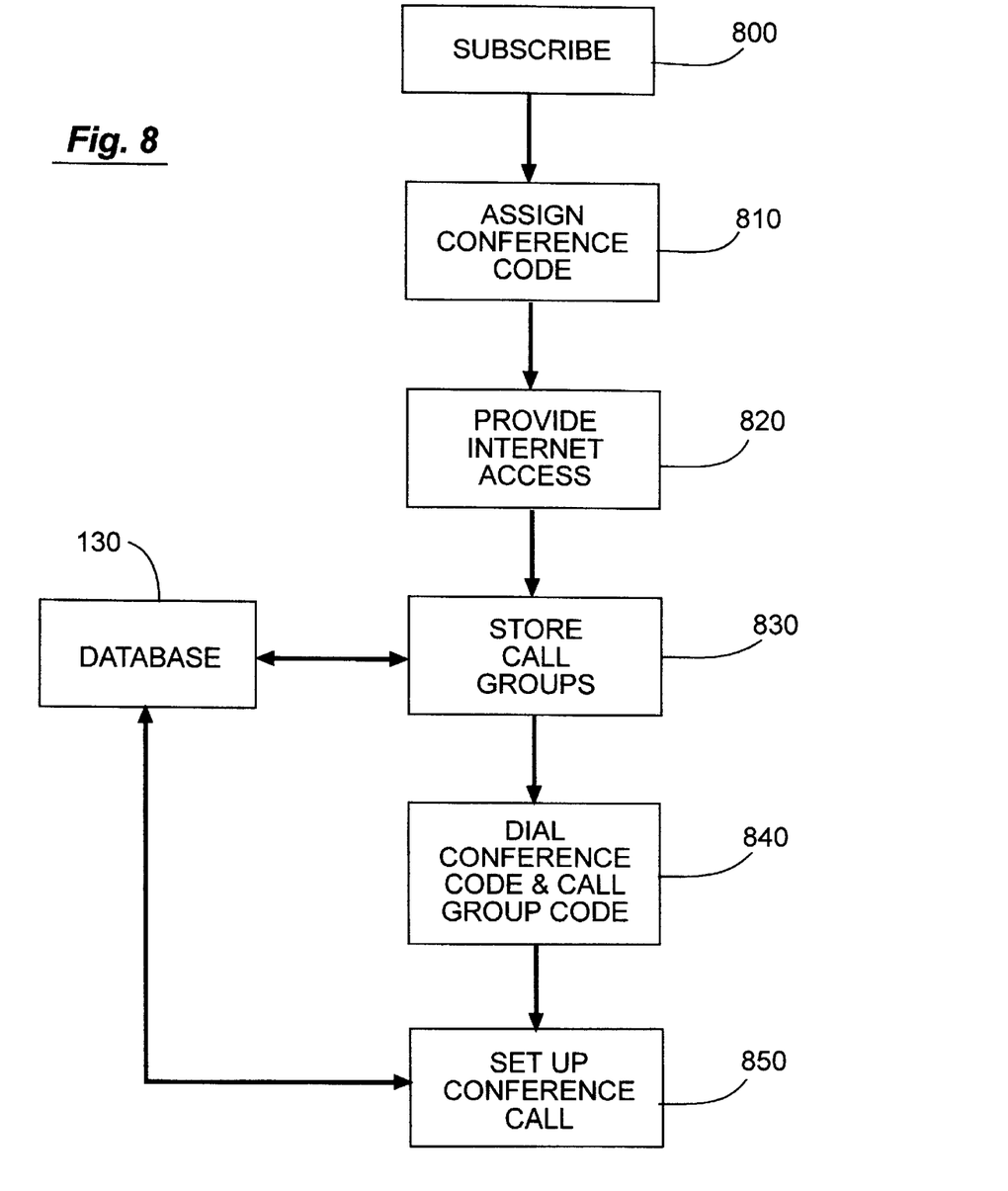
FIG. 8 sets forth one embodiment of the method for the subscriber to use the conferencing method of the present invention.

In FIG. 8, the method for a subscriber 20 to utilize the reservation-less instant group conferencing method of the present invention is set forth. The subscriber 20 subscribes 800 with the service provider's carrier's network 170 for the reservation-less instant group conferencing service. In this subscription process, all necessary information to service the subscriber 20 with respect to conferencing profile information is obtained. The network 170 is already programmed to switch 30a to respond to the conference code (i.e., the first string). LECs using the methods of the present invention will program their switches in advance of offering the service. This occurs in stage 810. The subscriber 22 can then access the database 130 over the public Internet 150 through any suitable access device 160 in stage 820. This can occur at any time for any number of times so that the subscriber 22 can generate any number of call groups (as allowed by the subscription) and as many participants to each call group (as allowed by the subscription). All such information in stage 830 is input and stored in the database 130. After a particular call group is stored with a particular call group code, the subscriber 20 can then dial in stage 840 the conference code and the call group code and as set forth in FIG. 7, the conference call is set up in stage 850. Conferencing system 100 accesses the database 130 for the call group information corresponding to the dialed-in call group code.

The above disclosure sets forth a number of embodiments of the present invention. Those skilled in this art will however appreciate that other arrangements or embodiments, not precisely set forth, could be practiced under the teachings of the present invention and that the scope of this invention should only be limited by the scope of the following claims.

We claim:

1. A conferencing method for providing a conference call for a subscriber in a telecommunications system comprising:
   receiving input signals, in a switch servicing a phone of the subscriber, from the phone of the subscriber when the subscriber requests the conference call;
   activating a trigger in the switch that the received input signals are requesting the conference call based on a first string of the received input signals;

setting up the conference call in a conferencing bridge in response to the activated trigger;

routing the phone of the subscriber to the conference call in the conferencing bridge;

obtaining a group of phone numbers of participants from a database, the group of phone numbers at least identified by a second string of the received input signals;

calling from the conferencing bridge each phone number of a phone for each participant in the obtained group;

connecting the phone of each participant in the conference call in the conferencing bridge when answered in response to calling.

2. The method of claim 1 wherein the input signals are a dual-tone multifrequency (DTMF) series of key inputs.

3. The method of claim 2 wherein the first string of the input signals starts with a "#" (pound) key input followed by at least one additional key input signal.

4. The method of claim 1 wherein the second string of signals corresponds to one of a plurality of groups for the subscriber in the database, each of said plurality of groups corresponding to a different group of phone numbers of participants.

5. The method of claim 1 wherein setting up the conference call comprises:

sending a message from the switch to a conferencing system that the subscriber is initiating the conference call, the message including at least the second string;

determining a conference profile for the subscriber;

selecting the conferencing bridge for the conference call based on the obtained conference profile.

6. The method of claim 5 wherein the message further contains a phone number of phone of the subscriber.

7. The method of claim 5 further comprising:

validating the subscriber to verify that the subscriber is allowed to make the conference call.

8. The method of claim 1 wherein the trigger is a dialed number trigger in the switch.

9. The method of claim 1 wherein obtaining the group of phone numbers further comprises:

using the phone number of the subscriber with the second string of input signals to obtain the group of numbers.

10. The method of claim 1 wherein obtaining the group of phone numbers further comprises:

using the phone number of the subscriber with the second string of input signals to obtain the group of numbers.

11. The method of claim 1 wherein calling each phone number of each participant further comprises:

presenting the phone number of the subscriber to the phone of each participant as each participant is called so that the said each participant is notified that the subscriber is calling.

12. The method of claim 1 wherein calling each phone number of each participant further comprises:

playing a voice message to said each participant when each said participant answers the aforesaid phone, the message informing each said participant of the conference call;

receiving at least one input signal from the phone of each said participant to join the conference call.

13. A conferencing method for providing a conference call for a subscriber in a telecommunications system comprising:

receiving input signals, in a switch servicing a phone of the subscriber, from the phone of the subscriber when the subscriber requests the conference call, the phone of the subscriber having a phone number;

sending a message from the switch to a conferencing system in response to receiving the input signals;

setting up the conference call in a bridge in the conferencing system in response to sending the message;

routing the phone of the subscriber to the conference call in the bridge;

obtaining a group of phone numbers of participants from a database containing at least one group, the group identified by the received input signals and the phone number of the subscriber;

calling from the conferencing system each phone number corresponding to a phone for each participant in the obtained group;

connecting the phone of each participant called to the bridge when answered in response to calling.

14. The method of claim 13 wherein the input signals comprise a first string of the input signals starts with a "#" (pound) key input followed by at least one additional key input signal.

15. The method of claim 13 wherein the input signals comprise a second string of signals corresponding to the at least one group for the subscriber in the database, each said at least one group corresponding to a different group of phone numbers of participants.

16. The method of claim 13 further comprising:

validating the subscriber to verify that the subscriber is allowed to make the conference call.

17. The method of claim 13 wherein calling each phone number of each participant further comprises:

presenting the phone number of the subscriber to the phone of each participant as each participant is called so that the said each participant is notified that the subscriber is calling.

18. The method of claim 17 wherein calling each phone number of each participant further comprises:

playing a voice message to said each participant when each said participant answers the aforesaid phone, the message informing each said participant of the conference call;

receiving at least one input signal from the phone of each said participant to join the conference call.

19. A conferencing method for providing a conference call for a subscriber in a telecommunications system comprising:

receiving input signals from a phone in the telecommunications system when the subscriber requests the conference call;

setting up the conference call for the subscriber in a bridge in a conferencing system in the telecommunications system in response to receiving the input signals;

routing the phone of the subscriber to the conference call in the bridge;

obtaining a group of phone numbers of participants from a database containing at least one group, the group at least identified by the received input signals;

calling from the conferencing system each phone number corresponding to a phone for each participant in the obtained group;

connecting the phone of each participant called to the bridge when answered in response to calling from the conferencing system.

20. The method of claim 19 further comprising:

enabling the subscriber to provide the database with new second strings and with information for new groups corresponding to the new second strings, the information containing at least the phone numbers of participants in the new groups.

21. A conferencing method for providing a conference call for a subscriber in a telecommunications system comprising:

enabling the subscriber, in a network in the telecommunications system, to subscribe to the conferencing method, the network servicing a phone of the subscriber;

assigning a conference code for the phone of the subscriber after the subscriber subscribes;

providing the subscriber with Internet access to a database in a conferencing system in the telecommunications system after the subscriber subscribes;

storing in the database information for at least one call group of participants for the subscriber in response to providing the subscriber access, the stored information based at least on a phone number of the phone of the subscriber, the information for each at least one call group including at least a unique call group code and phone numbers of each participant;

dialing the conference code and the unique call group code in the phone of the subscriber when the subscriber places the conference call to the call group corresponding to the unique call group code after storing the database information;

setting up the conference call in the conferencing system in response to dialing the conference code by (1) routing the phone of the subscriber to the conferencing system and (2) calling each phone number of each participant in the aforesaid call group in response to dialing the unique call group code.

* * * * *